(12) United States Patent
Tarnofsky et al.

(10) Patent No.: US 12,124,238 B2
(45) Date of Patent: Oct. 22, 2024

(54) METHOD AND SYSTEM FOR PROTECTING EXECUTION DATA AND/OR PROCESSING DATA OF A MACHINE TOOL

(71) Applicant: DMG MORI Software Solutions GmbH, Pfronten (DE)

(72) Inventors: Michael Tarnofsky, Lengenwang (DE); Holger Rudzio, Lotte (DE)

(73) Assignee: DMG MORI Software Solutions GmbH, Pfronten (DE)

( * ) Notice: Subject to any disclaimer, the term of this patent is extended or adjusted under 35 U.S.C. 154(b) by 497 days.

(21) Appl. No.: 17/268,454

(22) PCT Filed: Aug. 27, 2019

(86) PCT No.: PCT/EP2019/072840
§ 371 (c)(1),
(2) Date: Feb. 13, 2021

(87) PCT Pub. No.: WO2020/043723
PCT Pub. Date: Mar. 5, 2020

(65) Prior Publication Data
US 2021/0349442 A1    Nov. 11, 2021

(30) Foreign Application Priority Data

Aug. 31, 2018    (DE) ..................... 10 2018 214 840.6

(51) Int. Cl.
*H04L 9/30*    (2006.01)
*G05B 19/19*    (2006.01)
(Continued)

(52) U.S. Cl.
CPC ......... *G05B 19/4148* (2013.01); *G05B 19/19* (2013.01); *G05B 19/402* (2013.01); *H04L 9/30* (2013.01)

(58) Field of Classification Search
CPC ....... H04L 9/30; G05B 19/4148; G05B 19/19; G05B 19/402; G05B 19/042; G05B 19/409; G05B 2219/36542
(Continued)

(56) References Cited

U.S. PATENT DOCUMENTS 8,452,983 B2 *  5/2013  Lin ......................... G06F 21/10
                                                    713/192
11,204,600 B2 * 12/2021 Kettemer ........... G05B 19/4185
(Continued)

FOREIGN PATENT DOCUMENTS

CN         107291055 A     10/2017
DE         10125383 A1     6/2002
(Continued)

OTHER PUBLICATIONS

COSME: A distributed control platform for communicating machine tools in Agile Manufacturing Systems, Catalan et al, Sep. 2011 (Year: 2011).*

(Continued)

*Primary Examiner* — Jahangir Kabir
(74) *Attorney, Agent, or Firm* — Henricks Slavin LLP (57) ABSTRACT

The present invention relates to a method and a system for providing processing data to a numerically controlled machine tool (100), comprising: providing processing data (S301) to a data processing device (300), wherein the processing data comprises numeric control data, in particular one or more NC programs, on the basis of which a processing of a workpiece on the numerically controlled machine tool (100) can be carried out; specifying encryption specifications (S302) on the data processing device (300), which indicate specifications for encrypting the processing data and/or the execution data; specifying authentication specifications (S303) on the data processing device (300),
(Continued)

which indicate specifications for authentication of the numerical machine tool and/or of an operator of the machine tool; specifying execution specifications (S304) on the data processing device (300), which indicate specifications for the machining of the workpiece on the numerically controlled machine tool; generating execution data (S305) on the basis of the specified execution specifications, wherein the execution data comprises the processing data; and encrypting the execution data (S306) on the basis of the encryption specifications; providing or transmitting (S307) the generated execution data to a control device (200, 300) of the numerically controlled machine tool (100).

18 Claims, 5 Drawing Sheets

(51) Int. Cl.
  *G05B 19/402* (2006.01)
  *G05B 19/414* (2006.01)
(58) Field of Classification Search
  USPC ........................................................ 713/189
  See application file for complete search history.

(56) References Cited

U.S. PATENT DOCUMENTS

| | | | | |
|---|---|---|---|---|
| 2014/0200706 | A1* | 7/2014 | Pruschek | G05B 17/02 |
| | | | | 700/159 |
| 2015/0227930 | A1 | 8/2015 | Quigley et al. | |
| 2017/0235294 | A1* | 8/2017 | Shapiro | B23K 37/0211 |
| | | | | 700/97 |
| 2017/0302456 | A1 | 10/2017 | Visoky et al. | |
| 2020/0057430 | A1* | 2/2020 | Kettemer | G05B 19/4185 |

FOREIGN PATENT DOCUMENTS

| | | |
|---|---|---|
| DE | 699 10 166 T2 | 6/2004 |
| DE | 112012006329 T5 | 1/2015 |
| DE | 10 2016 008 910 A1 | 2/2017 |
| DE | 10 2016 220 566 A1 | 4/2018 |
| EP | 3232604 A1 | 10/2017 |
| EP | 3361339 A1 | 2/2018 |
| JP | 2007-102958 A | 4/2007 |
| JP | 2010-192959 A | 9/2010 |
| JP | 2017-117158 A | 6/2017 |
| JP | 2018-097667 A | 6/2018 |
| RU | 2427902 C1 | 8/2011 |
| WO | WO 2003/098898 A1 | 11/2003 |
| WO | WO 2004/001514 A1 | 12/2003 |
| WO | WO 2009/037065 A1 | 3/2009 |
| WO | WO 2015/014390 A1 | 2/2015 |

OTHER PUBLICATIONS

Office Action dated Apr. 28, 2023 for Chinese App. Ser. No. 201980053328.0, with English language translation.
Examination Report dated Aug. 1, 2019 for corresponding German App. Ser. No. 10 2018 214 840.6 with English Translation.
Office Action and Search Report dated Sep. 30, 2022 for corresponding EPO App. Ser. No. 19761810.1 with English Translation.
International Search Report dated Feb. 13, 2020 for PCT App. Ser. No. PCT/EP2019/072840.
Office Action and Search Report dated Apr. 8, 2022 for corresponding Russian App. Ser. No. 2021108424 with English Translation.
English language translation of Office Action dated Oct. 17, 2023 for Japanese App. Ser. No. 2021 536156.
Office Action dated Mar. 20, 2024 for Chinese App. Ser. No. 201980053328.0 with English language translation.
Office Action dated Apr. 23, 2024 for Japanese App. Ser. No. 2021-536156 with English language translation.

* cited by examiner

METHOD AND SYSTEM FOR PROTECTING EXECUTION DATA AND/OR PROCESSING DATA OF A MACHINE TOOL

The present invention relates to a method and a system for providing processing data to a numerically controlled machine tool.

BACKGROUND

In the art, numerically controlled machine tools, for example milling machines, rotary machines, sanding machines, milling/rotary machines, and processing centers, are known, which are equipped for machining workpieces clamped to a clamping means of the machine tool with one or more tools.

This occurs mostly at least partly based on processing programs, so-called NC programs (NC for numerical control and CNC for computerized numerical control, respectively), executed on the control device of the machine tool. Thereby, the NC programs mostly specify processing instructions, processing steps, and/or processing tracks processed by the control device, such that controllable actors of the machine tool such as axle drives, such as spindle drives and feed axis drives, or other drive systems of the machine tool such as electric, hydraulic, and/or pneumatic systems are controlled by the machine control based on the executed processing programs.

Controllable components, units, and systems, respectively, of the machine tool may comprise one or more work spindles of the machine tool and one or mostly more feed axes of the machine tool such as linear feed axes or rotary axes and swing axes, respectively, for controlling a relative movement of the tools relative to the workpiece to be processed. Other controllable components, units, and systems, respectively, of the machine tool may be: a workpiece pallet changer of the machine tool, a chip conveyor system of the machine tool, a tool changer system of the machine tool with one or more tool changers, possibly in combination with one or more tool magazines, a cooling lubricant supply system and cooling lubricant circulation system, respectively, automatically openable and closable, respectively, doors or flaps of the machine tool etc.

Nowadays, control systems of machine tools comprise, aside from a known NC control integrated on the machine tool (e. g. CNC machine controls by Siemens, Heidenhain, Fanuc, and other machine control providers) and connected PLC controls, additionally still further extended control and operating functions, respectively, which are typically realized on the operator panel of the machine tool.

Such operator panels of numerically controlled machine tools typically comprise a graphic user interface with one or more screens, possibly even a touchscreen with touch control and touch operating functions, respectively, and input units such as switches, controller wheels, and buttons and possibly also a keyboard, respectively, or other input devices known from computer controls, by which an operator may access the control and operating functions of the machine tool.

WO 2015/014390 A1 relates to a control and operating system of a numerically controlled machine tool, on which the machine control is provided with such an extended functionality. On one hand, the control and operating system comprises the machine control functions of the integrated NC control, and on the other hand, the control and operating system comprises an overlying data processing system, which executes the graphic user interface and provides it on the operator panel to the operator and which executes or executably provides, respectively, a plurality of control and operating programs extending the set-up, operating, and control functions of the machine tool.

Furthermore, the higher data processing system provides the functionality on the machine tool that sensor data of the machine tool can be read out, displayed, and further processed and handed over to externally connected data processing devices such as computer and/or server devices, for example over a connected data network.

Furthermore, it is also possible to deliver, from such externally connected data processing devices such as computer and/or server devices, data such as set-up data, tool data, workpiece data, processing data, processing programs or even installation data for other installable control and/or operating programs to the control device of the machine tool.

Hereby, the possibility arises that specified processing data concerning the processing of one or more workpieces of an employer are specified and directly delivered, through a network, to the control device of a machine tool of a contractor, to be able to directly perform processing of the workpiece or the workpieces, respectively, on the machine tool. Hereto, for example data from ERP (enterprise resource planning) systems and/or of data processings from CAD/CAM systems (CAD for computer aided design, CAM for computer aided manufacturing) may be provided and input to the control data processing device on a computer connected upstream or directly to the machine tool.

Data may be loaded or input, respectively, to the machine tool, to be processed or executed by the operator of the machine tool. This provides the advantage of enabling transmission of the data to the machine tool quickly and efficiently for direct and low-delay execution of the specified processing operations. The execution is executable for the operator, viewable on the graphic user interface, where particularly the NC code and its execution, respectively, are viewable, and the operator has, on the machine control, the possibility of intervening in the processing.

Starting from the previously described state of the art, it is an object of the present invention, to propose a method and a system for providing processing data to a numerically controlled machine tool, developing and improving the possibilities and functionalities of the handover of processing data of external data processing facilities to a machine tool control and the execution of the processing data on the machine tool.

SUMMARY

To solve the previously mentioned objects, a method for providing processing data to a numerically controlled machine tool is proposed.

According to one aspect, a method for providing processing data to a numerically controlled machine tool may be provided, comprising: providing processing data to a data processing device, the processing data preferably comprising numeric control data, particularly preferable one or more NC programs, based on which processing of a workpiece can be carried out on the numerically controlled machine tool; specifying execution specifications on the data processing device, preferably indicating specifications for processing the workpiece on the numerically controlled machine tool; generating execution data based on the specified execution specifications, the execution data preferably comprising the processing data and/or preferably indicating the execution specifications; and/or providing and/or transmitting the generated execution data to a control device of the numerically controlled machine tool.

Preferably, the method further comprises specifying encryption specifications on the data processing device, the specifications for the encryption of the processing data and/or the execution data and encrypting the processing data and/or of the execution data based on the encryption specifications. The execution data may be provided and/or transmitted to the control device of the numerically controlled machine tool in encrypted form and/or with encrypted processing data.

Encrypting the processing data and/or of the execution data is executed preferably by means of a public key associated with the numerically controlled machine tool in an asymmetric encryption method.

The encryption specifications preferably indicate whether the processing data and/or the execution data is to be encrypted and which portions of the processing data and/or of the execution data is to be encrypted, respectively.

The encryption specifications preferably indicate an encryption strength to be applied.

The encryption specifications and/or the execution specifications preferably indicate a permitted period, in which the encrypted processing data and/or execution data is decryptable.

The encryption specifications and/or the execution specifications preferably indicate a maximum number of permitted decryptions of the encrypted processing data and/or execution data and/or a maximum number of executions of the processing data.

The encryption specifications and/or the execution specifications preferably indicate whether the encrypted processing data and/or execution data is decryptable only directly when applied in a NC code execution system of the control device of the numerically controlled machine tool.

The encryption specifications and/or the execution specifications preferably indicate whether the processing data and/or execution data is viewable and/or editable on a graphic user interface of the control device of the numerically controlled machine tool.

The encryption specifications and/or the execution specifications preferably indicate whether the control device of the numerically controlled machine tool sends a notification to the data processing device before and/or after processing the workpiece based on the processing data.

The encryption specifications and/or the execution specifications preferably indicate whether the control device of the numerically controlled machine tool sends processing report data to the data processing device after processing the workpiece based on the processing data.

The encryption specifications and/or the execution specifications preferably indicate whether the processing report data is to be encrypted before transmitting it to the data processing device.

The encryption specifications and/or the execution specifications preferably indicate whether the control device of the numerically controlled machine tool sends a permission request to the data processing device before decryption of the encrypted processing data and/or execution data for approval of the decryption by the data processing device after permission validation is done.

Preferably, the method further comprises gathering a public key associated with the machine tool or other key data associated with the machine tool from an external server, wherein the processing data and/or the execution data is preferably encrypted with the public key gathered from the server or the key data gathered from the server.

Preferably, the method further comprises specifying of authentication specifications on the data processing device, indicating specifications for authentication of the numeric machine tool and/or of an operator of the machine tool, the execution data preferably further indicating the authentication specifications.

The execution specifications preferably indicate a permitted machine tool type or a permitted machine tool.

The execution specifications preferably indicate a required machine equipment of the machine tool, one or more required tools, and/or workpiece data.

According to a further aspect, a system is proposed for providing processing data to a numerically controlled machine tool, comprising a data processing device equipped for executing a method according to one or more of the previous aspects.

According to a further aspect, a computer program product is proposed, comprising instructions causing a computer executing the program to execute the method according to one or more of the previous aspects.

According to a further aspect, a method for providing processing data to a numerically controlled machine tool is proposed, comprising: receiving execution data generated according to a method according to one or more of the previous aspects on the control device of the numerically controlled machine tool, processing the execution data based on the execution specifications comprised in the execution data, optionally with decrypting the execution data and/or processing data comprised in the execution data, and/or executing the processing data, in particular comprising controlling the processing the on the numerically controlled machine tool based on the processing data.

According to a further aspect, a control device of a numerically controlled machine tool is proposed, the control device equipped for executing the previous method in combination with one or more of the previous aspects.

According to a further aspect, a computer program product is proposed, comprising instructions causing a control device of a numerically controlled machine tool executing the program to execute the previous method in combination with one or more of the previous aspects.

Further aspects and their advantages as well as advantages and more particular execution possibilities of the aspects and features described previously are described from the descriptions and explanations to the following attached figures, but by no means to be construed in a limiting manner.

DETAILED DESCRIPTION OF THE FIGURES AND PREFERRED EXECUTION EXAMPLES

Hereafter, examples and execution examples, respectively, of the present invention are described in detail referring to the appended figures. Here, identical and similar elements, respectively, in the figures can be denoted with identical reference numerals, but sometimes also with different reference numerals.

However, it should be emphasized that the present invention is in no way confined or limited, respectively, to the execution examples described in the following and their execution features, but comprises further modifications of the execution examples, in particular those comprised by modifications of the features of the described examples and by combination of individual or multiple features of the described examples within the scope of protection of the independent claims, respectively.

Figure 1:
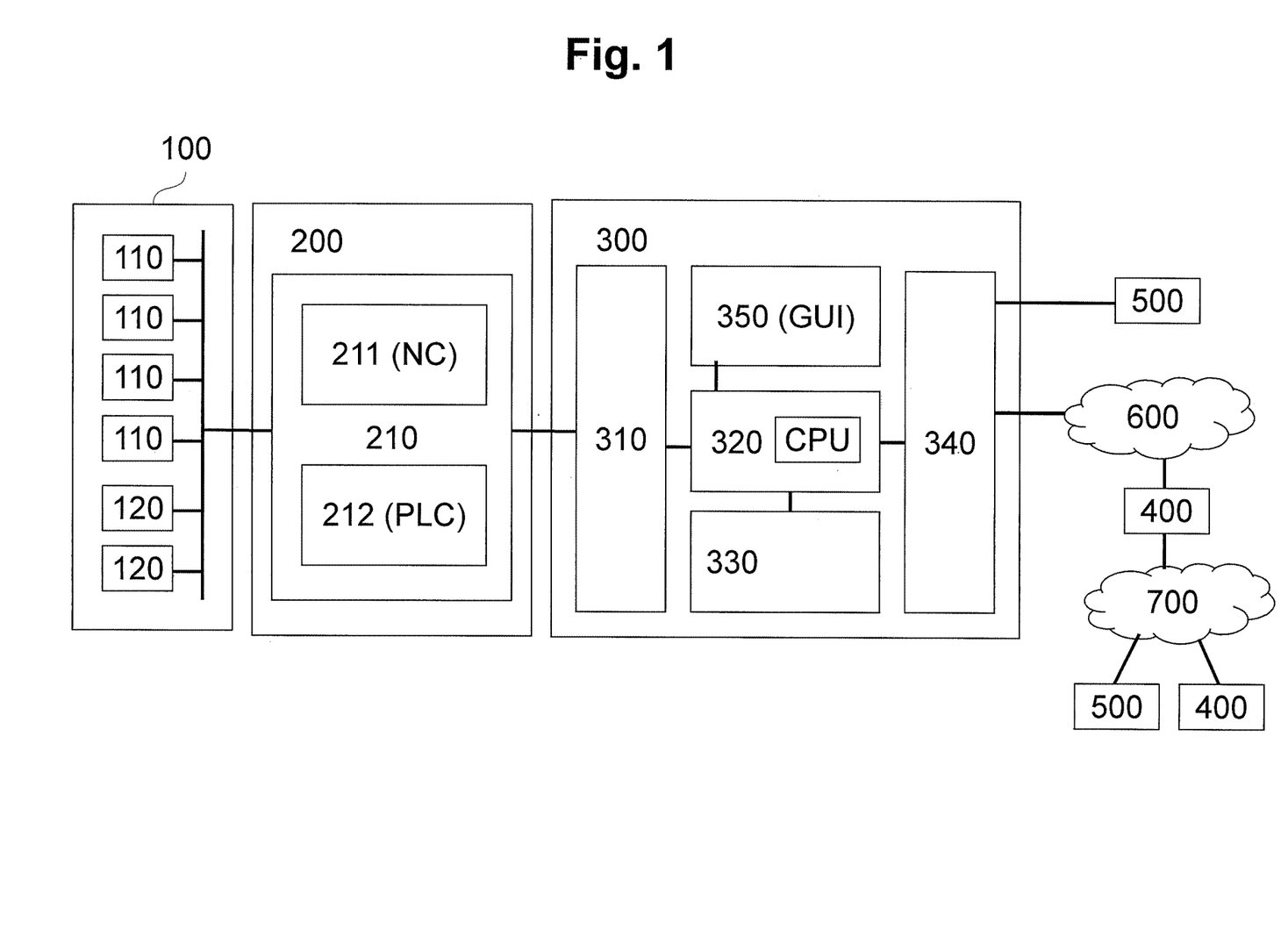
FIG. 1 shows an exemplary schematic depiction of a data processing apparatus for providing processing data to a numerically controlled machine tool according to an execution example of the invention.

FIG. 1 shows an exemplary schematic depiction of a data processing apparatus 300 for providing processing data to a numerically controlled machine tool 100 according to an execution example of the invention.

The data processing apparatus 300 (e. g. a data processing apparatus arranged in an operator panel of the machine tool or a data processing apparatus coupled to the operator panel of the machine tool) is connected to a control 200 of the machine tool 100 and optionally also to an external data processing device 500 and through a communications network 600 with a server 400, exemplary connected through another communications network 700 (e. g. the internet) with another server 400 and another external data processing device 500. The data processing apparatus 300 together with the control 200 forms the control device of the machine tool 100.

The machine tool 100 exemplary comprises a plurality of actors 110 of the machine tool 100 controllable by the control 200 and a plurality of sensors 120 to output sensor signals pertaining to a machine state of the machine tool 100 to the control 200.

For example, the actors 110 may comprise power units of controllable linear and rotary axes (swing and/or rotary axes) for a controlled relative movement between tool and workpiece and also power units of tool carrying work spindles (e. g. on milling machines) and workpiece carrying work spindles (e. g. on rotary machines), respectively. Furthermore, the actors 110 may be electronically, hydraulically, and/or pneumatically controlled valves, pumps, or other feeding devices of internal or external cooling lubricant feeder or compressed air feeders, respectively. In addition, conveyor devices, palette changers, workpiece changers, tool magazines, and other machine tool accessories may be controlled by power units or circuits and corresponding actors, respectively.

The sensors 120 may for example be sensors, which may be associated with the respective packages or components of the machine tool, for example the axles, the power units, axle bearings, the spindles, spindle bearings, a tool magazine, a tool changer, a palette or workpiece changer, an internal or external cooling lubricant feeding device, a chip conveyor device, and/or a hydraulic and/or pneumatic control.

The control 200 exemplary comprises a control apparatus 210 with a NC control 211 and a programmable logic control 212 (also referred to as SPS or PLC for "programmable logic control"). The control 200 is connected to the machine tool 100, in particular to be able to output control signals to the actors 110 of the machine tool for controlling the machine tool 100 and to be able to read out sensor signals of the sensors 120 of the machine tool 100.

The data processing apparatus 300 comprises a control side data interface 310 (control interface) for a data and signal connection with the control 200 and an external data interface 340 (universal interface) for a data connection with the external data processing apparatus 500 and the communications network 600 for a network connection with the server 400, respectively.

Furthermore, the data processing apparatus 300 comprises a data processing unit 320 comprising a CPU for processing data and for executing applications and processing programs and a data storage device 330 for storage of program or application data, respectively, processing data, configuration data, and sensor data (e. g. memory, RAM, hard disk, and/or a flash memory).

Furthermore, the data processing apparatus 300 exemplarily comprises a human-machine-interface 350 (also referred to as HMI for "human-machine-interface"), enabling an operator of the machine tool 100 to control, supervise, and/or operate the machine tool 100. The human-machine-interface 350 exemplarily comprises a graphic user interface GUI (GUI for "graphical user interface") that can be displayed on a monitor or touch screen.

The data processing apparatus 300 may exemplarily be equipped to input, process, and execute NC data of a processing program, in particular by executing the NC program, and to execute instructions indicated in the NC program to transmit instructions indicated in the NC program for execution to the NC control 211 and/or the PLC control 212 or to transmit based on the instructions indicated in the NC program corresponding control instructions and signals, respectively, for execution to the NC control 211 and/or the PLC control 212, respectively.

Figure 2:
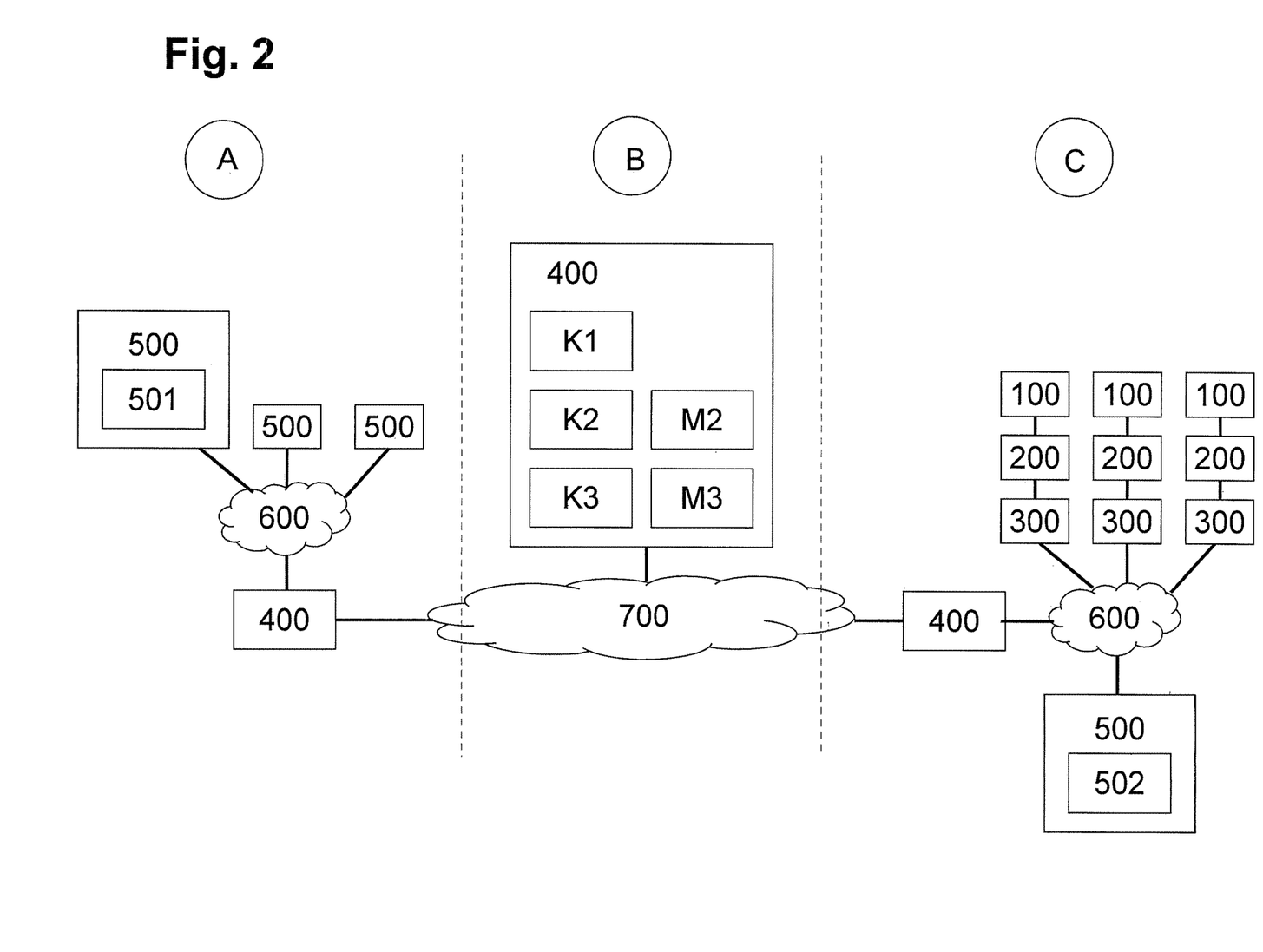
FIG. 2 shows an exemplary schematic depiction of a system for providing processing data to a numerically controlled machine tool according to an execution example of the invention.

FIG. 2 shows an exemplary schematic depiction of a system for providing processing data to a numerically controlled machine tool according to an execution example of the invention.

The system exemplarily comprises three areas A, B, and C. In area A, the system exemplarily comprises a server 400, connected through an exemplary internal communications network 600 of area A exemplarily with multiple data processing devices 500 of area A. One of the data processing devices 500 of area A is exemplarily provided with a processing data application 501, on execution of the data processing device 500 equipped for processing the processing data for provision to a machine tool 100.

Area A may exemplarily be associated with an employer desiring to commission processing of workpieces on machine tools to external contractors.

The server 400 of area A is exemplary further connected with an external communications network 700, particularly preferable for transmitting processing orders to a contractor, e. g. over the internet or a comparable externals communication network with a limited number of participants.

In area B, the system exemplarily comprises another server 400, exemplarily also connected with the external communications network 700. The server 400 of area B stores exemplary encryption key data K1, K2, and K3 (e. g. keys for application in asymmetric encryption methods such as public keys and/or private keys) and exemplary machine data M2 and M3, indicating the machine information for a respectively correspondingly associated machine tool such as properties, configuration, equipment, type, and/or functionalities of the associated machine tool.

Area B with the server 400 of area 400 may be associated to a machine manufacturer or a central service provider. The server 400 of area 400 may exemplarily centrally provide data for participants of the system for providing processing data to machine tools.

Exemplarily, the encryption key data K2 may be associated with the machine data M2 and the encryption key data K3 may be associated with the machine data M3. The encryption key data K1 may be associated with the server 400 of area A.

In area C, the system exemplary comprises another server 400, exemplary also connected with the external communications network 700. The server 400 of area C is exemplary further connected with an internal communications network 600 of area C, to which a data processing device 500 of area C is further exemplarily attached.

Furthermore, exemplary machine tools 100 are attached, through their respective control 200 and the respective data processing devices 300 connected to it, to the internal communications network 600 of area C.

Area C may exemplarily be associated to a contractor who desires to accept and execute orders for processing workpieces on machine tools from the employer of area A.

The data processing device 500 of area C exemplary has a machine tool simulation application 502 equipped to simulate, by execution on the data processing device 500 and based on machine data pertaining to a machine tool and processing data pertaining to processing a workpiece on the machine tool, processing the workpiece on the machine tool, in particular to simulate a collision test in the processing simulated on the machine tool. A corresponding machine tool simulation application 502 is known for example from DE 10 2006 043 390 A1.

Figure 3:
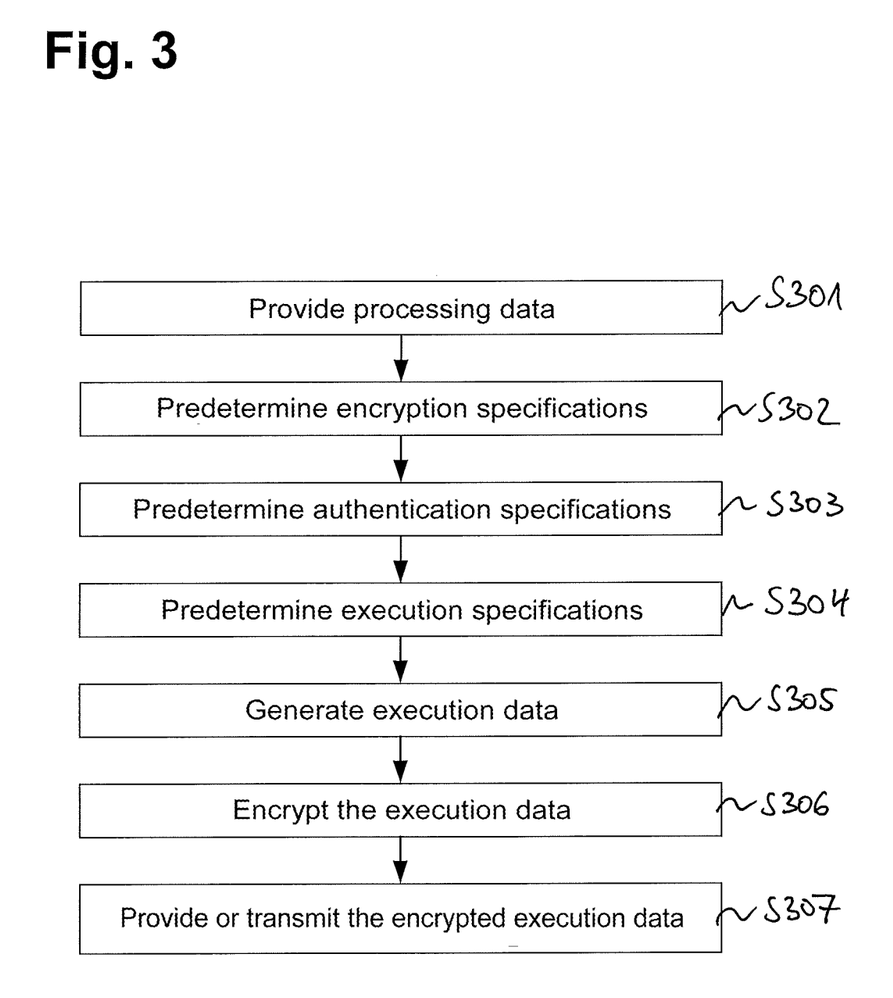
FIG. 3 shows an exemplary schematic depiction of a flow diagram of a method for providing processing data to a numerically controlled machine tool according to an execution example of the invention.

FIG. 3 shows an exemplary schematic depiction of a flow diagram of a method for providing processing data to a numerically controlled machine tool according to an execution example of the invention.

The method may preferably be performed on a data processing device 500 of area A in FIG. 2.

In a step S301, processing data indicating or specifying, respectively, the processing of one or more workpieces on a machine tool are provided.

The processing data may exemplarily have NC data comprising for example one or more NC programs. The one or more NC programs in this course preferably specify processing instructions, processing steps, and/or processing tracks processed by the control device such that controllable actors of the machine tool, such as axle drives, such as spindle drives and feed axis drives or other drive systems of the machine tool, are controlled by the machine control of the machine tool based on the executed processing program.

The processing data may exemplary be automatically generated on the data processing device 500 with a CAD/CAM application, for example based on 2D and/or 3D construction data pertaining to a finished part, or also by manual programming or manual adaptation of an automatically generated processing program.

The processing data may further be generated or adapted based on data of an ERP system.

In an optional step S302, encryption specifications are specified on the data processing device 500 of area A.

The encryption specifications can indicate whether the processing data is to be encrypted entirely or partly and whether the execution data to be transferred to the machine tool is to be encrypted entirely or partly. The operator of the data processing device 500 may for example specify whether and which, respectively, data or data components, respectively, are to be encrypted. Furthermore, the encryption specifications may indicate a desired or required encryption strength.

Furthermore, the encryption specifications may also indicate an encryption method to be applied, for example whether a symmetric or asymmetric encryption is to be applied and which concrete encryption method is to be applied, respectively. Here, it is possible for asymmetric encryption methods to specify a public key/private key encryption method, in which the data to be sent is to be encrypted with a publicly available public key of the recipient so that the recipient of the received encrypted data can be decrypted with a private key only available to the recipient. Furthermore, it is also possible that an encryption method based on a Diffie-Hellmann key exchange is used.

The encryption specifications can further specify whether the NC code of the processing program is decryptable on the graphic user interface of the operator panel, so that the NC program is partially or fully viewable on the graphic user interface for the operator of the machine tool or is to be kept concealed, so that the decryption of the NC code is performed by the NC code execution system only directly when executing the processing program, but the NC program is not viewable on the graphic user interface for the operator of the machine tool.

The encryption specifications may also specify whether a decrypted NC code and decrypted processing data, respectively, are to be made available to the operator of the machine tool on the data processing device 300 of the machine tool only as "read only" display, so that the NC code and the processing data, respectively, are not editable and adaptable, respectively, on the operator panel of the machine tool.

The encryption specifications may further specify in which period the processing data and/or the execution data is decryptable. This may limit the possibility of the execution of the processing to a permitted period and manufacturing period, respectively, in which the manufacturing by processing the workpiece is permitted.

Alongside the NC program and the NC code, respectively, of the processing data, the following data may be encrypted as desired: images and/or 3D models for example in view of a specified clamping situation of tool and/or workpiece, blank information (e. g. images, 3D models, geometry information, material information, and/or size information), data on the used tools and tool data, respectively, data to specified null points, CAD data of the finished part to be manufactured (e. g. images and/or 3D models), and/or other graphics, sketches, 2D drawings, 3D models, texts, or documents.

In an optional step S303, authentication specifications are specified on the data processing device 500 of area A.

The authentication specifications may indicate a designated recipient and whether and how, respectively, the designated recipient is to be authenticated. The authentication data indicating the designated recipient may indicate ID data identifying the recipient, which for example identify a contractor, a machine tool, or identify a group of machine tools (e. g. among the machine tools available at the contractor) (e. g. by a type indication and/or a machine tool number).

The operator of the data processing device 500 can thus specify whether and which, respectively, data should be extractable only for authenticated users and who and what, respectively, should be held as authenticated user (permitted recipient). Here, the operator may indicate an employer/user as permitted recipient, so that it is indicated and specified, respectively, that only machine tools of the authenticated employer/user may execute the processing data. Furthermore, the operator may already indicate and specify, respectively, special machine tools or groups of machine tools for example depending on the type and equipment of the machine tool as permitted recipients.

The authentication specifications can further specify whether the authorization of the recipient is to be verified by authentication for the first time or again before decryption of the processing data and/or before the processing start or even authentication data is to be sent to the server 400 of area A before decryption of the processing data and/or before the processing start, so that before approval of the decryption and/or the processing start, the authentication verification is or can be, respectively, performed on the server 400 of area A and the server 400 of area A sends the final approval prior to decryption of the processing data and/or prior to the processing start.

In step S304, execution specifications are specified on the data processing device 500 of area A.

The execution specifications can indicate one or more machine tools or machine types, respectively, which should or may, respectively, process the workpiece. The execution data can further indicate which equipment and fixture, respectively, is required on a special machine type, to be able to process the workpiece. The execution data can further indicate which tool is required or which tools are required, respectively, to be able to process the workpiece.

The execution specifications may further indicate a permitted manufacturing period, in which manufacturing a finished part by processing a workpiece is permitted based on the processing data, and/or a permitted manufacturing number, i.e., how many finished parts may be manufactured and how many workpieces may be processed based on the processing data, respectively.

The execution specifications may further predetermine whether the decryption of the processing data and the processing start and/or the processing the workpiece, respectively, is to be notified to the server 400 of area A, so that the server 400 of area A may monitor and supervise, respectively, the processing operations on external machine tools and track progress.

In a step S305, the execution data is generated on the data processing device 500 of area A based on the specified execution specifications and the provided processing data, optionally further based on the optionally specified encryption specifications and/or the optionally specified authentication specifications. The generated execution data comprises the processing data and other particulars indicating the specified execution specifications and optionally possibly specified encryption specifications and/or optionally possibly specified authentication specifications.

If encryption of the execution data is provided according to optionally input encryption specifications, the encryption of the generated execution data is performed based on the input encryption specifications in step S306.

Here, an encryption key associated with the designated recipient may be used. For example, a public key associated with the designated recipient may be used for encrypting the generated execution data.

If the encryption key or public key, respectively, associated with the designated recipient is not there, it may be obtained from the server 400 (certificate server) of area B and/or from the server 400 of area C of the designated recipient.

Here, it is for example possible that a respective encryption key or public key, respectively, is associated with the designated recipient, a machine tool of the designated recipient, a Gruppe of machine tools of the designated recipient, one or more data processing devices 300 of the designated recipient, and/or the server 400 of area C of the designated recipient. This may also be obtained based on the authentication data underlying the authentication specifications.

In the presence of the encryption key or public key, respectively, associated with the designated recipient or, respectively, after gathering the encryption key or public key, respectively, this encryption key or public key, respectively, is used in step S306 for encrypting the execution data and/or the processing data.

In step S307, the corresponding data, i.e., the generated execution data with processing data, the encrypted execution data comprising the processing data and/or the execution data with encrypted processing data is provided and/or transmitted over the network 700 to the area C (e. g. by e-mail or by TCP/IP).

For example, the execution data generated (and possibly encrypted) on a data processing device 500 of area A may be transmitted to the server 400 of area A. The execution data may then be provided on the server 400 of area A for download by one of the other servers 400 (pull method), so that the execution data is downloadable directly or indirectly through the server of area B from the server 400 of area A. Alternatively, the execution data may also be transmitted in a push method to the server 400 of area C (or also the server 400 of area B).

The execution data can further be provided in the internal network 600 of area C, to for example be gathered by the data processing device 500 or the data processing devices 300 of area C. Alternatively, the server 400 of area C may send the execution data directly to the intended machine tool 100 or, respectively, to its upstream data processing device 300 of area C and/or to the data processing device 500 of area C (push method).

Alternatively, the execution data may be delivered by e-mail to the target data processing device or target machine, respectively, or to the e-mail account of an operator or a user of the target tool machine or of the contractor.

Furthermore, the execution data may be manually handed over, for example through the exchange of USB storage media.

Figure 4:
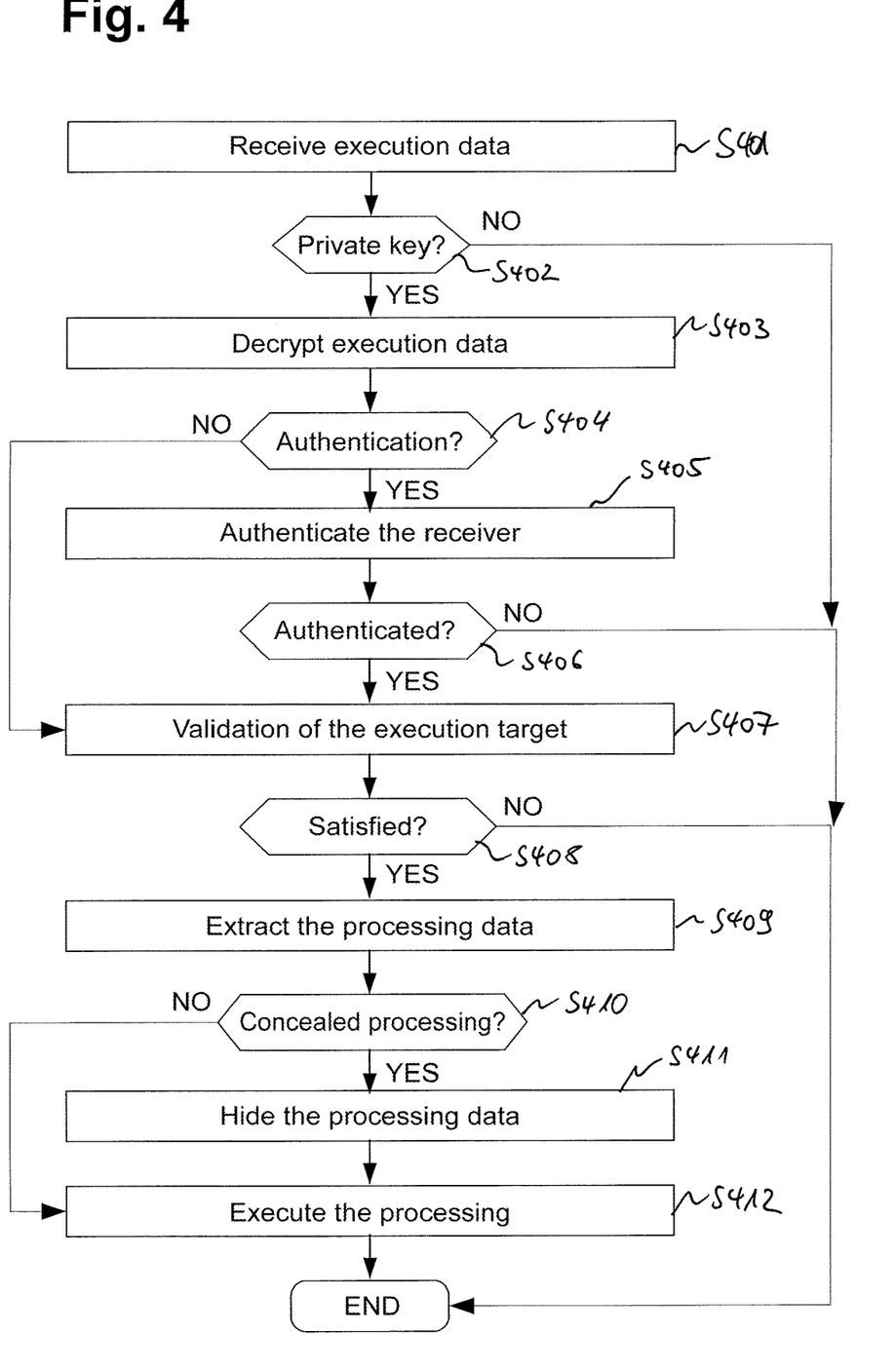
FIG. 4 shows an exemplary schematic depiction of a flow diagram of a method for processing provided processing data to a numerically controlled machine tool according to an execution example of the invention.

FIG. 4 shows an exemplary schematic depiction of a flow diagram of a method for processing provided processing data on a numerically controlled machine tool according to an execution example of the invention.

In step S401, the execution data is provided and received, respectively, on the data processing device 300 of the target-machine tool 100 (according to FIG. 1).

In step S402 it is validated whether a private key or encryption key, respectively, is there at the storage medium 330 (at least, when it is determined that the execution data is partially or fully encrypted). Without encryption of the data, i.e., if the execution data is received not encrypted, this step can be omitted. If no private key or encryption key, respectively, is there and the execution data is received encrypted, the execution data cannot be decrypted, and the method is canceled/terminated.

If a private key and encryption key, respectively, is there in the storage medium 330 (step S402 yields YES), the execution data is decrypted in step S403.

Here, after the decryption of the execution data, the processing data comprised in den execution data can be extracted. The processing data may be already decrypted after the decryption of the execution data or still be encrypted (e. g. when the decryption of the processing data and of the contained NC code, respectively, is only allowed to be decrypted when executing on the NC code execution system).

Furthermore, after decryption of the execution data, authentication conditions and authentication specifications, respectively, optionally included in the execution data, may be extracted. Based on the extracted authentication conditions, it can be determined in step S404 whether an authentication of the machine tool and/or of the operator on the machine tool is required.

If it is determined in step S404 that an authentication of the machine tool and/or of the operator is required on the machine tool (step S404 yields YES), the authentication of the recipient (i.e., of the machine tool and/or of the operator on the machine tool) is performed in step S405.

In step S406, it is determined whether the authentication according to the authentication specifications of the execution data has successfully occurred. If the authentication was not successful (step S406 yields NO), the processing is rejected, and the method is canceled/terminated.

In step S407, after the successful authentication or if no authentication is necessary, respectively (step S404 yields NO), step S407, in which the execution specifications of the execution data is verified, is exemplarily executed.

It is possible to verify based on the execution specifications whether the machine tool or the machine tool type of the machine tool, respectively, and/or the equipment or fixture, respectively, of the machine tool fulfill the execution specifications. Furthermore, it is possible to verify whether the blanks and/or tools available on the machine tool fulfill the execution specifications.

Furthermore, it is possible to verify whether the current point of time lies in the permitted manufacturing period, in which manufacturing a finished part by processing a workpiece based on the processing data is permitted, and/or whether the permitted manufacturing number has not been exceeded yet, if the processing data have already been used for processing other workpieces, which may be retained on the data storage device 300 by a counter.

In step S408, it is determined whether the execution specifications of the execution data are fulfilled. If the execution specifications of the execution data are not fulfilled (step S408 yields NO), the processing is rejected, and the method is canceled/terminated.

If the execution specifications of the execution data is fulfilled (step S408 yields YES), it is validated in the optional step S410 whether the encryption specifications and/or the execution specifications of the execution data indicate that the processing data is to be executed in a concealed manner, i.e., whether the operator of the machine tool is allowed to view the processing program and the NC code, respectively, on the graphic user interface or not and, respectively, also possibly whether the operator of the machine tool is allowed to edit or adapt the processing program and the NC code, respectively, on the graphic user interface or not.

If step S410 yields YES when it is determined that the operator of the machine tool is not allowed to view and is not allowed to edit or adapt, respectively, the processing program and the NC code, respectively, on the graphic user interface, the processing data is completely hidden from the operator (step S411), or, if it is allowed to view but not to edit and adapt, respectively, the NC code, respectively, it is only displayed as a read-only version.

In step S412, the processing data is executed on the data processing device 300 and processing the workpiece on the machine tool 100 is controlled through execution on the data processing device 300 through the control 200.

Alternatively, the method according to FIG. 4 may first be executed on the machine tool simulation application 502 of the data processing device 500 of area C, where here, a potential permitted manufacturing number or a permitted manufacturing period may possibly remain unconsidered.

In this case, the step S412 is simulated on the machine tool simulation application 502. Since the contractor may potentially not be able to view the NC code, it is thus advantageously possible that the contractor first tests on a corresponding virtual machine tool in a processing simulation, prior to execution of the execution data on a real machine tool, the processing data indicated there but possibly comprised in a concealed and encrypted, respectively, manner, to test the processing for collisions and possibly for other processing problems.

Such a simulation of the processing by means of a machine tool simulation application 502 may be limited in that the processing data may be simulated only record-by-record on the machine tool simulation application 502.

Preferably, contractor and machine tools of the contractor, respectively, and employer must first be registered on the server 400 of area B. In doing so, also encryption data keys and keys, respectively, may be distributed and administered.

Figure 5:
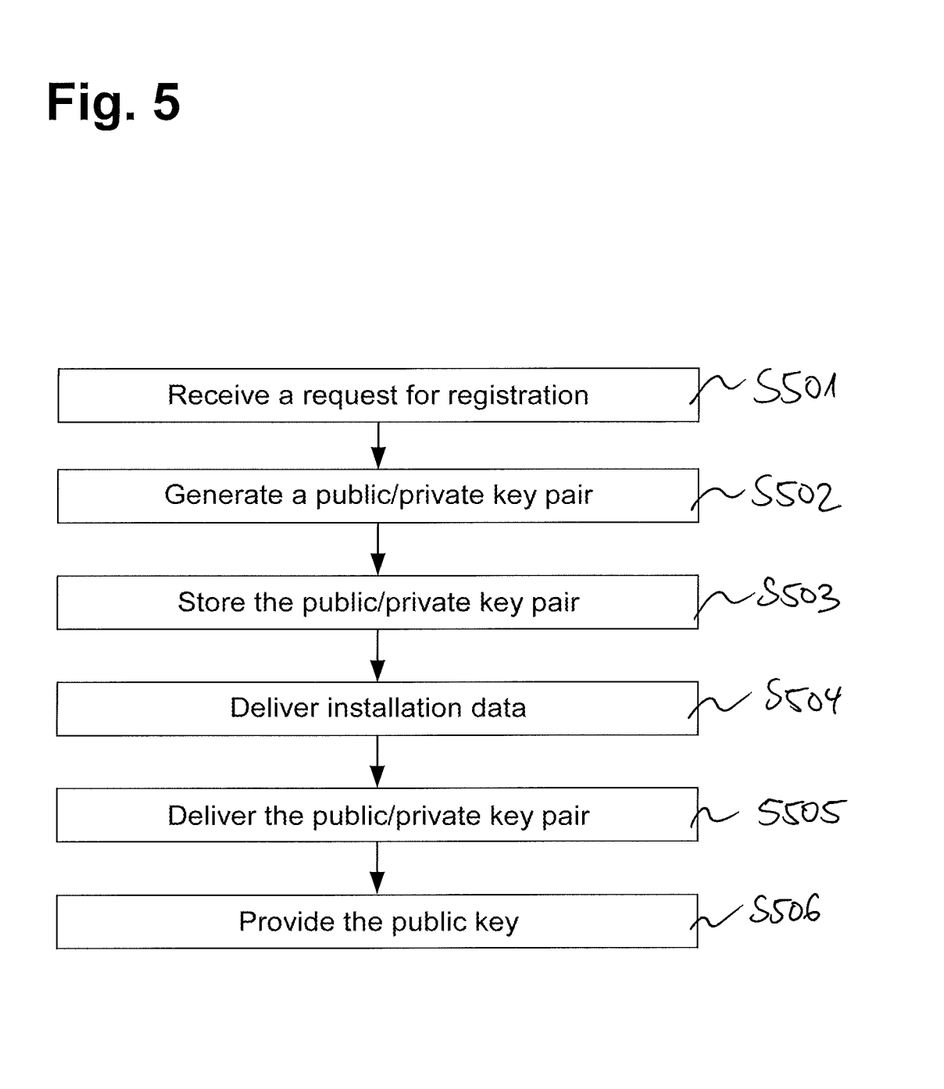
FIG. 5 shows an exemplary schematic depiction of a flow diagram of a method for providing encryption certificates according to an execution example of the invention.

FIG. 5 shows an exemplary schematic depiction of a flow diagram of a method for providing encryption certificates according to an execution example of the invention.

In step S501, a request for registration on the server 400 of area B is obtained. The server 400 of the area then exemplarily generates a pair of a public key and a corresponding private key in step S502 and stores the generated key pair in step S503 for administering the public and private keys.

In step S504, installation data is delivered to the requesting party (e. g. a data processing device 300 or 500 of one of the areas A or C), wherein the installation data is equipped for setting up an application that can execute a method according to FIG. 3 and/or according to FIG. 4.

In step S505, the generated encryption keys and private and public keys, respectively, are delivered to the requesting party (e. g. a data processing device 300 or 500 of one of the areas A or C).

Furthermore, in step S506, the public keys of the registered users are provided, so that others may gather the public keys as needed, to be able to encrypt execution data for application at the owner of the respective public key.

Storing the public and private keys on the server 400 has the advantage that also after a loss of private keys at participants, it is possible to decrypt potential encrypted data because the keys may be administered centrally by an independent instance.

Furthermore, it is also possible that participants generate public and private keys themselves and directly mutually exchange their public keys. Similarly, it is possible that a Diffie-Hellmann-encryption method is employed in which participants directly perform a Diffie-Hellmann-key exchange. Furthermore, participants and employers, respectively, may also themselves keep an electronic address book with address data, which stores target machines, contractors, and/or associated IP addresses.

In other execution examples, the execution data may be additionally provided with verification data, which facilitate a verification of data integrity prior to transmitting. In such execution examples, the data integrity of the present data may be verified prior to and/or after decryption and/or prior to and/or after execution of the execution data and processing data, respectively, based on the verification data. Such verification data may for example have one or more hash values, which may be calculated based on the encrypted and/or not encrypted execution data and/or based on the encrypted and/or not encrypted processing data.

In other execution examples, a processing report may be generated after the processing based on the processing data is done, and provided or transmitted, respectively, to the server 400 of area A of the employer. Such processing reports may also optionally be encrypted, for example with the public key of the employer (who has the corresponding private key for decryption). The public key of the employer may be gathered analogously to gathering the public key of the machine tool and of the contractor, respectively, from the server 400 of area B.

Such processing reports may indicate, aside from the processing information on processing start and processing end, in addition whether control errors have occurred in the processing. In addition, also information on sensor values of the sensors 120 of the machine tool acquired during the processing period and on position measurement results, respectively (e. g. by measurement button), may be indicated in processing reports. Thus, the employers may perform an external quality test.

In other execution examples, the processing data may be provided on the contractor side not only encrypted, concealed, and/or as read-only version, but further copy protection mechanisms may be provided such that copying the processing data is prohibited.

In other execution examples, the execution data may be cached and/or stored for a long time on the server 400 of area B.

The present invention advantageously facilitates that the know how present at the creator of the processing data and the employer, respectively, may be protected and nonetheless, processing data may be delivered to external contractors efficiently and safely for executing the processing on external machine tools at the external contractors, wherein it may be ensured simultaneously that the processing and execution specifications are to be complied with and the data is also protected. The data transmission to the machine tool can advantageously be end-to-end encrypted and is protected, wherein the data integrity can be ensured.

Above, examples and execution examples, respectively, of the present invention as well as their advantages were described in detail referring to the appended figures. It shall be emphasized again that the present invention is, however, in no way confined or limited, respectively, to the previously described execution examples and their execution features, but further comprises modifications of the execution examples, particularly those comprised by modifications of the features of the described examples and by combinations of individual or multiple features of the described examples, respectively, within the scope of protection of the independent claims.

The invention claimed is:

1. A method, comprising:
providing processing data to a data processing device, wherein the processing data comprises numeric control data, in particular one or more NC programs, based on which processing of a workpiece can be carried out on a numerically controlled physical machine tool in a machine equipment arrangement;
specifying execution specifications on the data processing device indicating the specifications for processing the workpiece on the numerically controlled physical machine tool;
generating execution data based on the specified execution specifications, wherein the execution data comprises the processing data and indicates the execution specifications; and
providing or transmitting the generated execution data to a control device, including a programmable logic control, of the numerically controlled physical machine tool.

2. A method according to claim 1, characterized by:
specifying encryption specifications on the data processing device, the specifications for the encryption of the processing data and/or of the execution data; and
encrypting the processing data and/or the execution data based on the encryption specifications; wherein
the execution data is provided or transmitted to the control device of the numerically controlled physical machine tool in an encrypted manner and/or with encrypted processing data.

3. A method according to claim 2, characterized in that encrypting the processing data and/or the execution data being carried out in an asymmetric encryption method by means of a public key associated with the numerically controlled physical machine tool.

4. A method according to claim 2, characterized in that the encryption specifications indicate whether the processing data and/or the execution data is to be encrypted and which portions of the processing data and/or the execution data is to be encrypted, respectively.

5. A method according to claim 2, characterized in that the encryption specifications indicate an encryption strength to be applied.

6. A method according to claim 2, characterized in that the encryption specifications and/or the execution specifications indicate a permitted period in which the encrypted processing data and/or execution data is decryptable.

7. A method according to claim 2, characterized in that the encryption specifications and/or the execution specifications indicate a maximum number of permitted decryptions of the encrypted processing data and/or execution data and/or a maximum number of executions of the processing data.

8. A method according to claim 2, characterized in that the encryption specifications and/or the execution specifications indicate whether the encrypted processing data and/or execution data is decryptable only directly on application in a NC code execution system of the control device of the numerically controlled physical machine tool.

9. A method according to claim 2, characterized in that the encryption specifications and/or the execution specifications indicate whether the processing data and/or the execution data is viewable and/or editable on a graphic user interface of the control device of the numerically controlled physical machine tool.

10. A method according to claim 2, characterized in that the encryption specifications and/or the execution specifications indicate whether the control device of the numerically controlled physical machine tool sends a notification to the data processing device before and/or after processing the workpiece based on the processing data.

11. A method according to claim 2, characterized in that the encryption specifications and/or the execution specifications indicate whether the control device of the numerically controlled physical machine tool sends processing report data to the data processing device after processing the workpiece based on the processing data.

12. A method according to claim 11, characterized in that the encryption specifications and/or the execution specifications indicate whether the processing report data is to be encrypted before being transmitting to the data processing device.

13. A method according to claim 2, characterized in that the encryption specifications and/or the execution specifications indicate whether the control device of the numerically controlled physical machine tool sends a permission request to the data processing device before decrypting the encrypted processing data and/or execution data, for approval of the decryption by the data processing device after the permission validation is done.

14. A method according to claim 2, characterized by:
gathering a public key associated with the physical machine tool or other key data associated with the physical machine tool from an external server; wherein
the processing data and/or the execution data is encrypted with the public key gathered from the server or the key data gathered from the server.

15. A method according to claim 1, characterized by:
specifying authentication specifications on the data processing device, indicating the specifications authentication of the physical machine tool and/or of an operator of the physical machine tool; wherein
the execution data further indicates the authentication specifications.

16. A method according to claim 1, characterized in that the execution specifications indicate a permitted physical machine tool type or a permitted physical machine tool.

17. A method according to claim 1, characterized in that the execution specifications indicate a required machine equipment of the physical machine tool, one or more required tools, and workpiece data.

18. A method according to claim 1, further comprising:
processing the execution data on the control device of the numerically controlled physical machine tool based on the execution specifications in the execution data, optionally with decrypting the execution data and/or the processing data comprised in the execution data; and executing the processing data on the numerically controlled physical machine tool based on the processing data.

* * * * *